J. G. BOWER.
LEVELING INSTRUMENT FOR USE IN UNDERGROUND WORKINGS.
APPLICATION FILED MAY 25, 1914.
1,145,664.  Patented July 6, 1915.
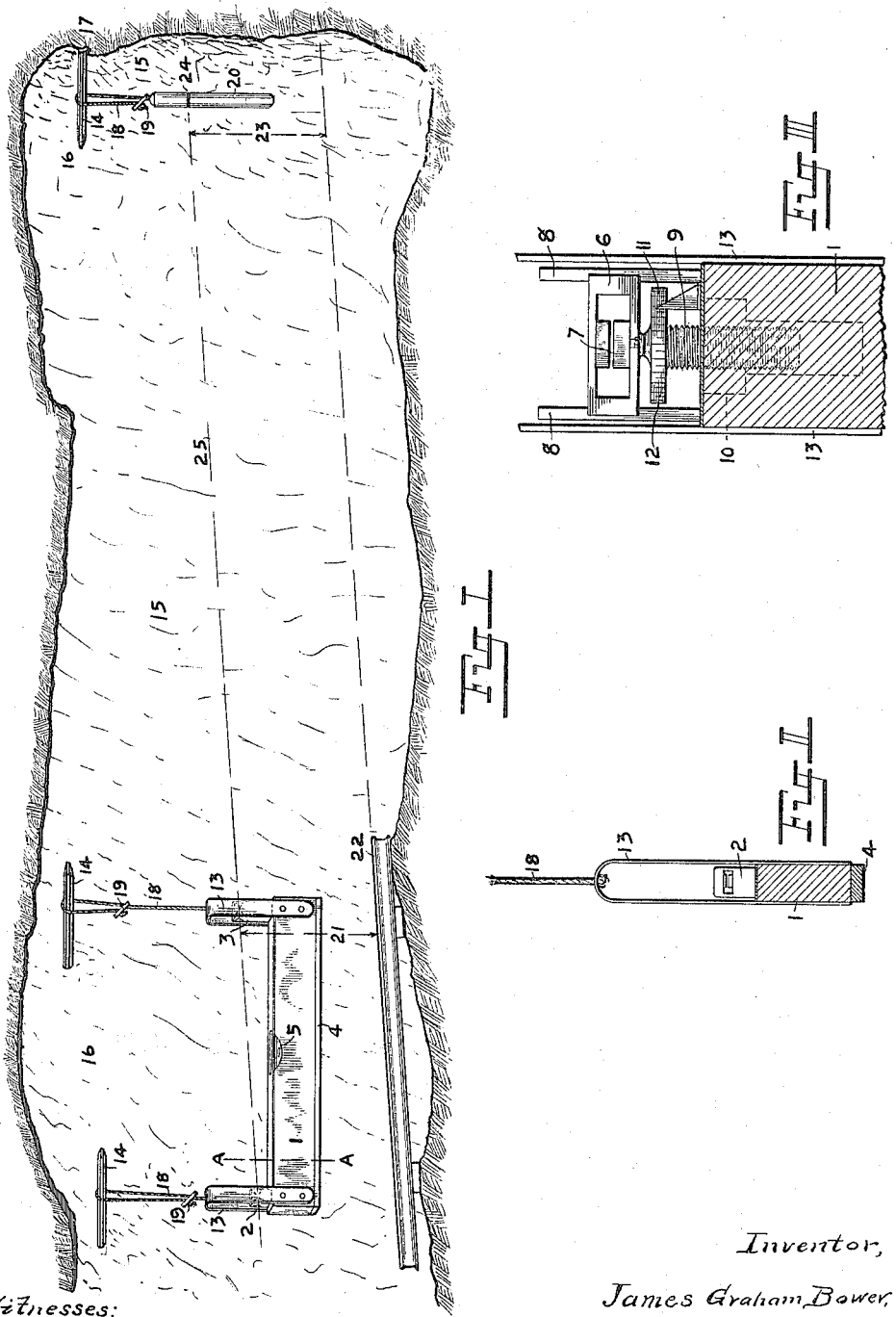
Inventor,
James Graham Bower,
By Glenn S. Noble
Att'y,
Witnesses:

UNITED STATES PATENT OFFICE.

JAMES GRAHAM BOWER, OF JOHANNESBURG, TRANSVAAL, SOUTH AFRICA.

LEVELING INSTRUMENT FOR USE IN UNDERGROUND WORKINGS.

1,145,664.          Specification of Letters Patent.          Patented July 6, 1915.

Application filed May 25, 1914. Serial No. 840,847.

*To all whom it may concern:*

Be it known that I, JAMES GRAHAM BOWER, British subject, residing at National Mutual Buildings, Rissik street, Johannesburg, Transvaal, Union of South Africa, have invented certain new and useful Improvements in Leveling Instruments for Use in Underground Workings, of which the following is a specification, reference being had therein to the accompanying drawing.

This invention consists in an improved leveling instrument for use in underground workings such as mines, tunnels and the like.

The object of the invention is to provide an instrument which is cheap and simple, while meeting the requirements of track laying and similar purposes which do not call for great accuracy.

The invention is illustrated by the accompanying drawings, in which:—

Figure I is a perspective view of the instrument in use. Fig. II an enlarged section on line A—A Fig I, and Fig. III an enlarged view showing an adjustable sight.

According to this invention there is provided a straight rigid beam 1 of suitable length and provided at each end with sights 2, 3 of any suitable form. The beam may be weighted as by a metal strip 4, to insure stability. A bubble or like level 5 is so secured to the beam as to indicate when the latter is positioned horizontally. Either sight or both of them may be made adjustable as to height so as to sight in a horizontal or inclined plane, as desired. For this purpose as shown in Fig. III the sight proper comprises a block 6 suitably perforated with sighting apertures 7 and adapted to slide vertically in guide ways 8. To the block is revolubly attached threaded pin 9 working in a nut 10 embedded in the beam 1. Revolution of the pin 9 raises or lowers the sight as desired. For turning the pin 9 a head 11 may be provided on which may be marked suitable graduations 12 to indicate the angle at which the instrument is set. Preferably, however, in order that the instrument may be used by untrained men with the least liability to error, the sights 2, 3 are permanently fixed (Figs. I and II) to give a line at a definite angle with the horizontal, *e. g.* the gradient of a track.

The beam is provided at both ends with means for suspending it from the roof or otherwise in underground workings. Such means as shown may conveniently take the form of straps 13 of metal or other suitable material, looped over the sights 2, 3 and secured to the sides of the beam 1. Said straps also serve to protect the sights.

For suspending the apparatus a pair of drills 14, 14 or other available bars are placed transversely of the tunnel or the drive 15, and engage the side walls 16, 17. Cords 18 provided with slip buckles 19 for adjusting their lengths connect the straps 13, and drills 14. The distant sighting point may take the form of a rod of wood 20, suitably marked and suspended similarly to the instrument.

In using the instrument for instance in laying a track at a predetermined gradient in the underground workings of a mine, the instrument is suspended as above described and the level brought to a horizontal position. The sighting rod 20 is suspended at a point a convenient distance along the proposed route of the track, and adjusted to be in line with the sights on the instrument. Measurement of the height 21 of the sights on the instrument above the track 22 will give the distance 23 below the sighting point 24 at which the track must lie at such point, or below any other point on the sighting line 25.

What I claim and desire to secure by Letters Patent is:—

1. A leveling instrument comprising in combination a rigid beam, a level thereon, sights on the beam, and adjustable means for suspending the beam.

2. A leveling instrument comprising in combination a rigid beam, a level thereon, sights on the beam, straps looping over the sights and provided with cords adjustable in length and adapted to be used for suspending the beam.

In testimony whereof I affix my signature in presence of two witnesses.

JAMES GRAHAM BOWER.

Witnesses:
    WESLEY E. JOHN,
    RITA YULE.

Copies of this patent may be obtained for five cents each, by addressing the "Commissioner of Patents, Washington, D. C."